Figure 1:
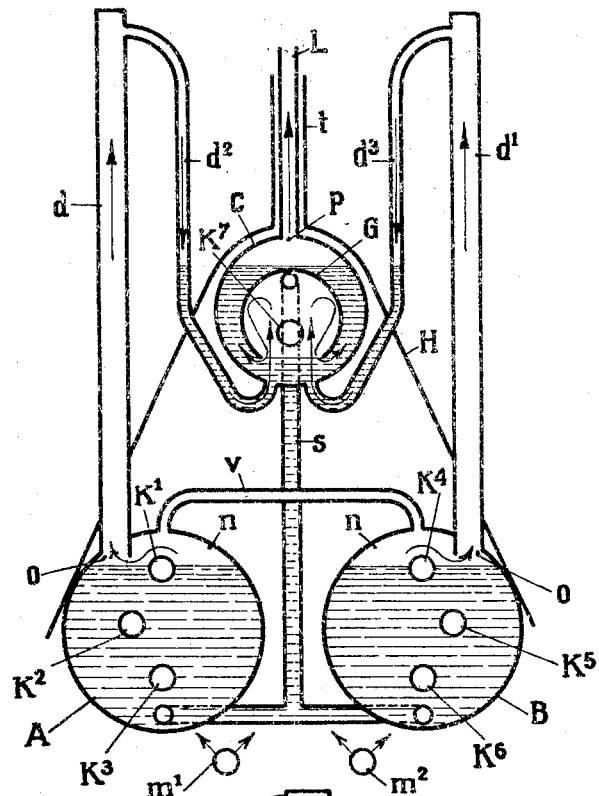

Sept. 25, 1928.

A. RICHTER 1,685,340

ABSORPTION REFRIGERATING APPARATUS

Filed Sept. 15, 1924 2 Sheets-Sheet 1

Inventor:
A. Richter
By Marks & Clerk
Attys.

Sept. 25, 1928.

A. RICHTER 1,685,340

ABSORPTION REFRIGERATING APPARATUS

Filed Sept. 15, 1924    2 Sheets-Sheet 2

Inventor:
A. Richter
By Markes Clerk
Attys

Patented Sept. 25, 1928.

1,685,340

UNITED STATES PATENT OFFICE.

ALFRED RICHTER, OF DOBERITZ, NEAR BERLIN, GERMANY, ASSIGNOR TO A.-G. FÜR HANDELS- UND INDUSTRIEWERTE GLARUS, OF GLARUS, SWITZERLAND.

ABSORPTION REFRIGERATING APPARATUS.

Application filed September 15, 1924, Serial No 737,917, and in Germany September 19, 1923.

This invention relates to a refrigerating apparatus working on the absorption principle, in which from a vessel containing a so-called refrigerating liquid (for instance an aqueous solution of ammonia or spirit of ammonia) the refrigerating medium proper, for instance the ammonia or the spirit of ammonia, is forced out during one period of time by boiling and is thereupon forced into other parts of the apparatus, namely, a condenser, in which the refrigerating medium is liquefied and an evaporator, in which the refrigerating medium is evaporated by absorbing heat from the outside. During the next period of time the vessel is cooled, so that a greater or less degree of vacuum is produced over the liquid, for instance water left over from the boiling and the gases of the refrigerating medium formed in the evaporator are reabsorbed. The gaseous refrigerating medium must be introduced through the liquid in the vessel at the lowest possible point, so that it is forced to flow through the said liquid before it can reach the vacuum above the liquid in the same vessel. The refrigerating medium will be greedily absorbed by the liquid and at the end of this period of time there will again be present in the vessel a refrigerating liquid, which is saturated with the refrigerating medium, so that boiling can again take place. The liquid in the vessel must be of such a nature that it is capable absorbing the refrigerating medium and is therefore referred to as the absorption liquid. The refrigerating medium can be absorbed from the evaporator along the same path, along which it was forced out, or through other pipes. By the absorption of heat in the evaporator from the outside surroundings the cooling action is produced.

The whole of the apparatus should be evacuated as perfectly as possible.

Apparatus of this kind as used hitherto worked with members, which had to be adjusted from the outside either by hand or automatically at the end of each period (boiling or reabsorbing), and the requisite movable parts were the cause of leakages and break-downs in the plant. Other apparatus of a known kind worked with immersion bells or other additional devices in the vessel for the refrigerating liquids. In the latter case the space within the vessel is not utilized to the best effect and relatively large quantities of water are required for the boiling operation.

The object of the present invention is to provide an apparatus, which has no moving parts and permits of the use of containers for the refrigerating liquid, which are smaller than those used hitherto, so that the heating is more efficiently utilized. According to the invention any number of such containers may be used in combination and be controlled jointly. Thus, it is possible to use small vessels so that, should they be damaged, the disadvantages caused thereby will be less serious, than where large containers are used.

The invention consists in this, that vessels are used as boilers and absorbers, which are not in direct communication, but in indirect communication with the other parts of the apparatus (condenser, evaporator and the like) by way of controlling vessels containing a liquid and which act as vessels, through which a flow takes place and which work on the principle of the displacement of the level, the arrangement being such that, when the liquid in them is at a certain level, pipes coming from the steam space and, when the liquid is at another level, pipes connected to as low a point as possible of the liquid space of the main vessel are connected to the other parts of the apparatus, such as the condenser, evaporator and the like. When the level in the controlling vessel is altered, in at least one of the connecting pipes between the main vessel and the controlling vessel (intermediate vessel) the liquid will be at a different level during the boiling in the main vessel and during the reabsorption and will act as a liquid seal. One or more main vessels may be connected to one controlling vessel.

Figure 2:
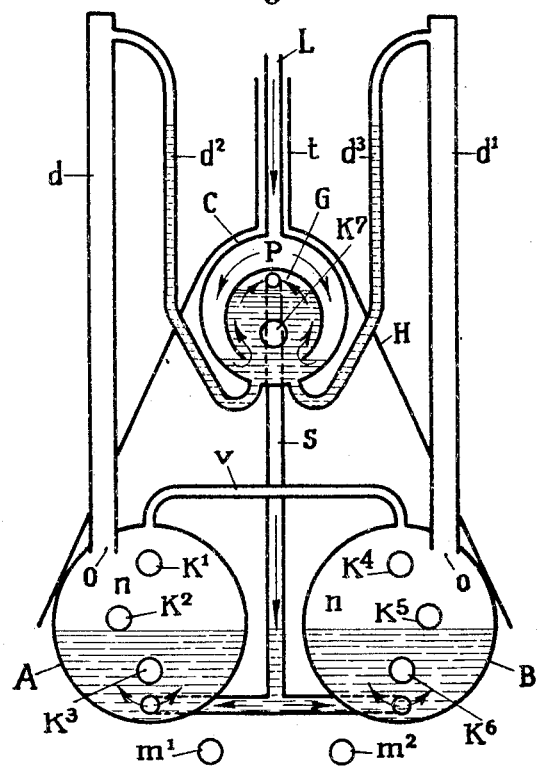

In the accompanying drawings Figs. 1 and 2 show diagrammatically and in section a constructional example, in which a controlling vessel is placed higher than the main vessels and externally of the same, Fig. 1 showing the boiling period and Fig. 2 the reabsorption or absorption period.

Figure 3:
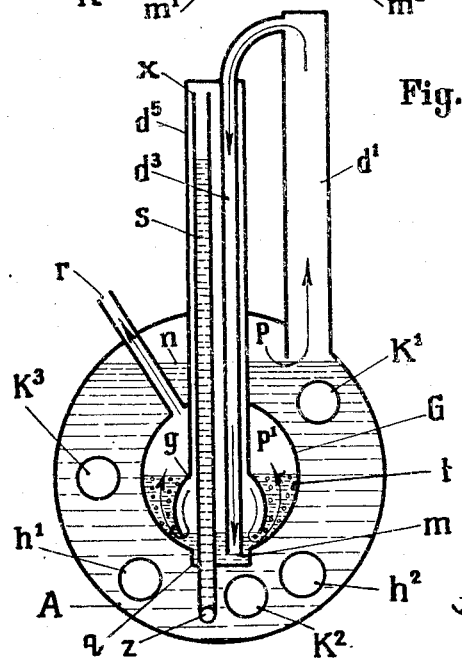
Figure 4:
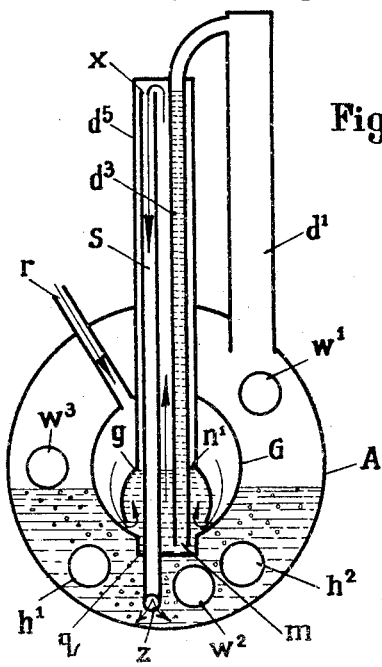

Figs. 3 and 4 show diagrammatically and in section another constructional example, in which the controlling vessel is located within the main vessel.

Fig. 3 again representing the boiling period and Fig. 4 the reabsorption or absorption period.

In Figs. 1 and 2 A and B are the main vessels, which contain the refrigerating liquid (an aqueous solution of ammonia or spirit of ammonia). $m^1$, $m^2$ are pipes, out of which a combustible gas mixture or a combustible fluid flows in the direction of the arrows, which is ignited during the boiling period. $k^1$ to $k^6$ are pipes in the main vessels, through which a refrigerating medium flows during the absorption period.

C is a controlling vessel, which acts as an intermediate vessel and in which is located a bell-shaped vessel G which is only open at its lower side. Pipes $d^2$, $d^3$ coming from the lowest point of the vessel C connect the vessel C to the vertical pipes $d$, $d^1$, which communicate with the steam space $n$ of the main vessels A, B at $o$. The steam spaces $n$ are preferably connected at the highest point by a pipe $v$, so that the pressures in them must be equal. To the lowest part of the main vessels A and B are connected the branches of a pipe $s$, the other end of which is connected to the highest point of the bell G.

$k^7$ is a pipe in the bell G, through which a cooling medium (gas or liquid) flows during the absorption period.

The highest point of the steam space P of the vessel C is connected by a pipe L to the other parts of the apparatus (condenser, evaporator and the like).

Preferably a heat insulating cover H is provided, which collects the rising combustion gases of the flame at the pipes $m^1$, $m^2$, conveys them round the controlling vessel C and conducts them away through an escape pipe $t$.

At the commencement of the boiling period the two main vessels A and B are almost completely filled with the refrigerating liquid, while the vessel C is filled only to one-third of its capacity, preferably also with the refrigerating liquid.

During the boiling period (expulsion period) the apparatus operates in the following manner (Fig. 1):—

By heating the two vessels A and B by means of any suitable source of heat (represented in Fig. 1 as gas heating through pipes $m^1$, $m^2$) the refrigerating medium (ammonia) is driven out of the absorption liquid (water). The refrigerating medium accumulates in the form of gas in the space $n$ at the top of the main vessels and, owing to being at a pressure above that of the atmosphere, displaces the liquid from the vessels A and B through the pipe $s$ into the controlling vessel C (intermediate vessel), until the level of the liquid has been forced down below the openings $o$ of the pipes $d$, $d^1$. As soon as the openings $o$ are free of the liquid, the gaseous refrigerating medium will flow through the pipes $d$, $d^1$, $d^2$, $d^3$ in the direction shown by the arrows to the controlling vessel C, from where they pass into the bell G from below. The bell G becomes filled with the gases until the liquid in the bell has been forced completely out into the vessel C. The gases then bubble up through the liquid in the vessel C into the gas space P of the vessel C, from where they pass through the pipe L into the other parts of the apparatus (condenser, evaporator). While this is going on there will always be a column of liquid in the pipe $s$, the height of which is such that its liquid pressure balances the difference of the pressures in the other parts of the apparatus and in the vapour spaces $n$. This prevents any more liquid being forced from the vessels A and B into the vessel C, after the commencement of flow through the intermediate vessel C.

The cover H forces the combustion gases to sweep around the controlling vessel C and to help to heat the same. This heating is further increased by the heat of the gases flowing through the controlling vessel C from the main vessels A and B. By this means most of the refrigerating medium (ammonia) is driven out of the liquid contained in the controlling vessel C.

The apparatus acts in the following manner during the cooling period (absorption period) (Fig. 2):—The source of heat is turned off and a cooling medium is passed through the cooling pipes $k^1$ to $k^7$.

Through the cooling of the solution (absorption liquid), which contains relatively little ammonia, in the main vessels A and B, the pressure in the latter will be reduced and will fall below the pressure in the evaporator. Owing to the increased pressure thus obtained, the gases of the refrigerating medium will pass from the evaporator through the pipe L in the direction shown by the arrows into the controlling vessel C and will force the liquid out of the latter into the bell G, and also into the suction pipes $d^2$, $d^3$, which communicate with the lowest part of the controlling vessel C. Liquid is forced into these pipes until a column of liquid has been formed, the static pressure of which balances the difference of the pressures in the other parts of the apparatus and in the gas spaces of the main vessels. This makes it impossible for the gases to flow directly into the main vessels A and B.

Any excess of liquid, which the bell G is unable to contain, is forced through the pipe $s$ into the main vessels A and B. The gases thereupon pass in the direction of the arrows into the bell G and flow through the liquid contained therein, which consequently absorbs a correspondingly small amount of the refrigerating medium (ammonia). The greater part of the gases will pass through the pipe $s$ into the main vessels A and B at the lowest point of the same and will thus be forced to flow through the whole of the absorption liquid in the main vessels A and B on its way to the spaces $n$, so that it will be entirely absorbed during its passage.

Obviously the pipe $s$ will act as an accumulator during the boiling period and the pipes $d^2$, $d^3$ will act similarly during the cooling period and the liquid accumulated in them will act as liquid seals, which will have the same effect as a mechanical valve.

In the constructional example shown in Figures 3 and 4, parts acting in a similar manner are given the same reference letters as in Figures 1 and 2.

The vessel A, which acts as the boiler and absorber, contains the controlling vessel G, which acts as the vessel through which the liquid flows, the intermediate vessel, in which is the bell-shaped vessel $g$. From the vapour space $p$ in the vessel A a pipe $d_1$ of large diameter passes upwards and is connected at the top to the pipe $d_3$, which opens at $m$ in the vessel G at the lowest point of the same. Preferably an extension $q$ is provided at the bottom of the vessel G, so that the orifice $m$ of the pipe $d_3$ is always immersed in the liquid even when the apparatus is inclined. The bell $g$ is extended upwardly in the form of a tubular dome $d_5$ in which are the pipes $s$ and $d_3$, of which the pipe $s$ leads to the lowest part of the liquid space of the vessel A. From the controlling vessel C a pipe $r$ leads through the vessel A to the outside to the other parts of the apparatus (the condenser, evaporator and the like). The pipes $k_1$, $k_2$, $k_3$ are cooling pipes, through which a cooling medium flows during the absorption period. Electric heating elements may be placed in the pipes $h_1$, $h_2$ in the main vessel A, which will act as the source of heat during the boiling period. The heat may of course be supplied from other sources of heat, for instance by gas flames from the outside or by a liquid or gaseous heat transmitting medium, for instance steam, being passed through the pipes $k_1$ to $k_3$ during the boiling period in place of the cooling medium.

The apparatus operates as follows during the boiling period (Figure 3):

The main vessel A is filled up to about the mark $n_1$ with a refrigerating liquid, for instance a high percent solution of spirit of ammonia. The controlling vessel C is filled to about one third of its volume with a similar solution. By means of the source of heat a portion of the refrigerating medium is driven out of the water and accumulates in the form of a gas in the vapour space $p$, from which, owing to its pressure being above that of the atmosphere, it passes through the pipe $d_1$ and its extension $d_2$ in the direction shown by the arrows into the intermediate vessel C. At the same time a column of liquid will have accumulated in the pipe $s$, which is extended to a suitable height, the height of which column corresponds to the difference of the pressures in the vapour space $p$ and in the other parts of the apparatus (evaporator and the like) and balances the same. The column of liquid prevents gases from passing directly out of the main vessel into the intermediate vessel through the pipe $s$ and thus acts as a liquid seal during the boiling period. The gases emerging at the lowest point $m$ first accumulate in the bell $g$ and force the liquid in the said bell into the outer vessel G. The gases thereupon pass through the liquid $t_1$ owing to their pressure being above that of the atmosphere in the intermediate vessel C, into the vapour space $p$ and pass thence in the direction of the arrows through the pipe $r$ to the condenser. In the condenser they are liquefied and accumulate in an evaporator.

As soon as the boiling period is finished, the cooling period may commence.

During the cooling period (Fig. 4) the apparatus operates in the following manner:

Owing to the boiling vessel A cooling through the action of the cooling water, which flows through the cooling pipes $k_1$, $k_2$, $k_3$, the pressure in the vessel A will fall below that in the evaporator. Hence gases will flow back from the evaporator through the pipe $r$. The pipe $r$ first conveys the gases into the vessel G, in which the returning gases force the liquid into the bell $g$, and thereupon flow through the liquid. The gases then rise in the tubular dome $d_5$, pass at the highest point $x$ into the pipe $s$ and are conveyed down the pipe till they reach the lowest point $z$ where they enter the vessel A and are distributed in the absorption liquid, thus becoming absorbed.

During the cooling period there can be no direct flow of the gases from the vessel G into the vapour space $p$ of the vessel $k$ as a column of liquid accumulates in the pipe $d_3$ which balances the pressure above atmospheric in the vessel G relative to the vapour space $p$ of the vessel A, while the column of liquid in the pipe $s$, which accumulated during the boiling period, will have sunk, owing to the reversal of the pressure conditions during the cooling period.

The continuous functioning of this hydrostatic control is ensured more particularly by the fact that the volume of liquid in the vessel G is always automatically kept equal. Assuming for instance that through some circumstance liquid should have passed from the controlling vessel G into the vessel A, the liquid level in the latter would be raised and during the next boiling period this liquid would automatically return into the controlling vessel G, as the pipe $d_1$ passes so far into the main vessel A that the gases cannot escape from the vapour space $p$ into the pipe $d_1$ before the excess of liquid is forced back through the pipe *s* into the controlling vessel G and the level in the main vessel has fallen to the mark $n_1$. If, in the converse case, the controlling vessel G should be filled to excess with liquid through any circumstance, as much liquid will remain in the controlling vessel G during the first cooling period (Fig. 4) as can find room in the chamber G with the lome $d_5$. The excess of liquid will discharge automatically through the pipe *s* into the vessel A, until the level $n_1$ is reached.

The liquid contained in the controlling vessel G is also utilized for refrigerating purposes, as this vessel is located within the vessel A and is heated or cooled by the latter.

During the boiling period the pipe *s* again acts as an accumulator and during the cooling period the pipe $d_3$ acts as an accumulator in which a sealing liquid accumulates, which has the same action as a mechanical valve.

Having now particularly described and ascertained the nature of said invention and in what manner the same is to be performed, I declare that what I claim is:—

1. In an absorption refrigeration apparatus, the combination of an absorber vessel adapted to contain a liquid absorbent for the refrigerant, a second vessel likewise adapted to contain a liquid and having a vapor outlet at the top thereof, an inverted receptacle disposed in said second vessel, pipes providing communication between said vessels, one of said pipes connecting the top or vapor space of said absorber vessel with the second vessel of a point below the liquid level therein, said pipe being so disposed as to act as a liquid seal and another of said pipes establishing communication between the absorber vessel, at a point below the liquid level therein and within the inverted receptacle, and the second vessel at a point above the point at which the first mentioned pipe terminates in the second vessel, said pipe being so disposed as to act as a liquid seal.

2. In an absorption refrigeration apparatus, the combination of an absorber vessel adapted to contain a liquid absorbent for the refrigerant, a second vessel likewise adapted to contain a liquid and having a vapor outlet at the top thereof, an inverted receptacle disposed in said second vessel, pipes providing communication between said vessels, one of said pipes connecting the top or vapor space of said absorber vessel with the second vessel at a point below the liquid level therein and beneath the opening of the inverted receptacle, said pipe being so disposed as to act as a liquid seal and another of said pipes establishing communication between the absorber vessel, at a point below the liquid level therein and within the inverted receptacle, and the second vessel at a point above the point at which the first mentioned pipe terminates in the second vessel, said pipe being so disposed as to act as a liquid seal.

3. In an absorption refrigeration apparatus, the combination of an absorber vessel, adapted to contain a liquid absorbent for the refrigerant, a second vessel disposed within said absorber vessel likewise adapted to contain a liquid and having a vapor outlet at the top thereof, an inverted receptacle within said second vessel, pipes providing communication between said vessels, one of said pipes connecting the top or vapor space of said absorber vessel and terminating in said second vessel at a point below the liquid level therein, said pipe being so disposed as to act as a liquid seal, and another of said pipes establishing communication between the absorber vessel, at a point below the liquid level therein and within the inverted receptacle, and the second vessel at a point above the point at which the first mentioned pipe terminates in the second vessel, said pipe being so disposed as to act as a liquid seal.

4. In an absorption refrigeration apparatus, the combination of an absorber vessel, adapted to contain a liquid absorbent for the refrigerant, a second vessel disposed within said absorber vessel likewise adapted to contain a liquid and having a vapor outlet at the top thereof, an inverted receptacle within said second vessel, pipes providing communication between said vessels, one of said pipes connecting the top or vapor space of said absorber vessel and terminating in said second vessel at a point below the liquid level therein, and beneath the opening of the inverted receptacle, said pipe being so disposed as to act as a liquid seal, and another of said pipes establishing communication between the absorber vessel, at a point below the liquid level therein and within the inverted receptacle, and the second vessel at a point above the point at which the first mentioned pipe terminates in the second vessel, said pipe being so disposed as to act as a liquid seal.

ALFRED RICHTER.